US008254910B1

(12) United States Patent
Breau et al.

(10) Patent No.: US 8,254,910 B1
(45) Date of Patent: Aug. 28, 2012

(54) NETWORK MANAGEMENT BASED ON MOBILITY AGENT BINDING TABLES

(75) Inventors: Jeremy R. Breau, Leawood, KS (US); Terry D. Nebergall, Gardner, KS (US); Frederick C. Rogers, Olathe, KS (US); Joseph Christopher Shojayi, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 388 days.

(21) Appl. No.: 12/480,679

(22) Filed: Jun. 8, 2009

(51) Int. Cl.
*H04W 24/00* (2009.01)
*H04W 4/00* (2009.01)
*H04B 7/00* (2006.01)

(52) U.S. Cl. ........ 455/424; 455/522; 455/525; 455/423; 455/422.1

(58) Field of Classification Search .................. 455/423, 455/445, 425, 424, 422.1, 522, 525; 370/352
See application file for complete search history.

(56) References Cited

U.S. PATENT DOCUMENTS

| 6,067,290 | A * | 5/2000 | Paulraj et al. ............... 370/329 |
| 6,141,565 | A | 10/2000 | Feuerstein et al. |
| 6,275,695 | B1 | 8/2001 | Obhan |
| 6,515,975 | B1 * | 2/2003 | Chheda et al. ............... 370/332 |
| 6,603,966 | B1 | 8/2003 | Sheffield |
| 6,996,374 | B1 | 2/2006 | Bao et al. |
| 7,206,574 | B2 * | 4/2007 | Bright et al. ............... 455/426.1 |
| 7,218,928 | B2 * | 5/2007 | Park et al. ............... 455/423 |
| 7,848,782 | B2 | 12/2010 | Stern-Berkowitz et al. |
| 8,170,547 | B1 | 5/2012 | Bhan et al. |
| 2005/0259591 | A1 * | 11/2005 | Moore et al. ............... 370/252 |
| 2006/0159048 | A1 * | 7/2006 | Han et al. ............... 370/331 |
| 2007/0037570 | A1 | 2/2007 | Donovan et al. |
| 2007/0217381 | A1 * | 9/2007 | Williams et al. ............... 370/338 |
| 2007/0225029 | A1 | 9/2007 | Abusch-Magder |
| 2011/0122866 | A1 * | 5/2011 | Vasamsetti et al. ............... 370/352 |

OTHER PUBLICATIONS

Bhan, Ashish, et al., "Dynamic Adjustment of a Base Transceiver Station in a Wireless Communication System", U.S. Appl. No. 12/016,070, filed Jan. 17, 2008.
Office Action dated Mar. 17, 2011, U.S. Appl. No. 12/016,070, filed Jan. 17, 2008.
Final Office Action dated Aug. 31, 2011, U.S. Appl. No. 12/016,070, filed Jan. 17, 2008.
Advisory Action dated Nov. 21, 2011, U.S. Appl. No. 12/016,070, filed Jan. 17, 2008.
Notice of Allowance dated Dec. 23, 2011, U.S. Appl. No. 12/016,070, filed Jan. 17, 2008. Bhan, Ashish, et al., "Dynamic Adjustment of a Base Transceiver Station in a Wireless Communication System", U.S. Appl. No. 13/427,066, filed Mar. 22, 2012.
FAIPP Pre-Interview Communication dated Jun. 20, 2012, U.S. Appl. No. 13/427,066, filed on Mar. 22, 2012.

* cited by examiner

*Primary Examiner* — Jinsong Hu
*Assistant Examiner* — Opiribo Georgewill

(57) ABSTRACT

Systems and methods provide network management based on mobility agent binding tables. A query component queries mobility agent binding tables to obtain mobile devices' data. The data may identify a group of mobile devices or the mobile devices may be in a geographic location. The query component may send a message to the group of mobile devices via the mobile devices' network access identifiers. A base transceiver station's operational parameter may be adjusted based on a comparison of the data to a threshold. Binding tables' updates may be written in response to receipt of updates, or binding tables may be accessed. Binding tables may be queried to obtain mobile devices' data to promote management action. The data may identify home agent binding tables, foreign agent binding tables, packet data serving nodes, radio network controllers, base transceiver stations, network access identifiers, home addresses, care of addresses, and time to live.

17 Claims, 4 Drawing Sheets

NETWORK MANAGEMENT BASED ON MOBILITY AGENT BINDING TABLES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A mobile device may be a mobile phone, a personal digital assistant (PDA), a mobile computer, a digital camera, a mobile telecommunication device, a digital music player, a mobile handset, a handheld gaming device, a wireless mobile device, a pager, a portable computer, a tablet computer, a laptop computer, a digital calculator, a media player, an inventory control device, or any other device that can communicate via a mobile communication protocol. Although the present disclosure uses the mobile internet protocol (IP) communication protocol as an example, embodiments of the present disclosure may use other mobile communication protocols.

A mobile device can communicate via two IP addresses—a permanent home address, which is associated with the communication network in which the mobile device is initially registered, and a care-of address, which is associated with another communication network that the mobile device is visiting, or using for communication. The care-of address changes as the mobile device moves from communicating via one communication network to another. A home agent is a router that stores information about mobile devices whose permanent home address is registered in the home agent's communication network. A foreign agent is a router that stores information about mobile devices visiting its communication network. Foreign agents also convey care-of addresses for visiting mobile devices to the home agents that store the home addresses for these mobile devices.

An IP communication from a communication device to the mobile device initially uses the permanent home address of the mobile device as the destination address for sending IP packets. Because the home address logically belongs to the network associated with the mobile device's home agent, normal IP routing mechanisms forward these IP packets to the home agent. However, if the home agent is notified of a care-of address for the mobile device, the home agent redirects these IP packets towards the foreign agent that provided the care-of address instead of forwarding these IP packets to a destination that is physically in the same network as the home agent. The home agent looks for the care-of address in a table known as a binding table and then tunnels the IP packets to the mobile device's care-of address by appending a new IP header to the original IP packet, thereby preserving the original IP packet header. The foreign agent decapsulates IP packets at the end of the tunnel to remove the IP headers added by the home agent, and delivers the IP packets to the mobile device.

The mobile device may send IP packets directly to the communication device through the foreign agent, without sending the IP packets through the home agent, using its permanent home address as the source address for the IP packets. Using the home address for the source address while bypassing the home agent is known as triangular routing. In some networks, the foreign agent may employ "reverse tunneling" by tunneling the mobile device's IP packets to the home agent, which in turn forwards them to the communication device.

However, the use of a foreign agent is optional. Mobile IP communication protocol includes a mode of operation known as "co-located IP address", which enables mobile device software to perform many of the equivalent roles of the foreign agent. This mode of operation is adopted when it is not possible to have foreign agent functionality, such as when using an existing packet data serving node (PDSN) or a roaming wireless local area network that does not support a foreign agent.

SUMMARY

In some embodiments, a system is provided for network management based on mobility agent binding tables. The system includes a processor and a query component. The query component, when executed by the processor, queries multiple mobility agent binding tables to obtain data associated with multiple mobile devices to identify a group of mobile devices. The query component also sends a message to the identified group of mobile devices via network access identifiers associated with the mobile devices. The data is associated with at least two of a home agent binding table, a foreign agent binding table, a packet data serving node, a radio network controller, and a base transceiver station.

In some embodiments, multiple mobility agent binding tables are queried to obtain data associated with multiple mobile devices in a geographic location. The data is associated with at least two of a home agent binding table, a foreign agent binding table, a packet data serving node, a radio network controller, and a base transceiver station. The data is compared to at least one threshold. An operational parameter of a base transceiver station is adjusted based on the comparison.

In some embodiments, a system includes a first processor on a home agent, a home agent component, a second processor on a foreign agent, a foreign agent component, a third processor on a network component, and a query component. The home agent component, when executed by the first processor, promotes writing a home agent update to a home agent binding table in response to receipt of a home agent update and/or accessing the home agent binding table. The home agent binding table stores data that identifies a network access identifier, a home address, a foreign agent, a care-of address, a policy server, an authentication-authorization-accounting server, and/or a time to live. The foreign agent component, when executed by the second processor, promotes writing a foreign agent update to a foreign agent binding table in response to receipt of a foreign agent update and/or accessing the foreign agent binding table. The foreign agent binding table stores data that identifies the network access identifier, the home agent, the home address, the care-of address, a radio network controller, a communication technology, an international mobile subscriber identification, and/or the time to live. The query component, when executed by the third processor, queries the foreign agent binding table and/or the home agent binding table to obtain data associated with multiple mobile devices to promote a management action.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
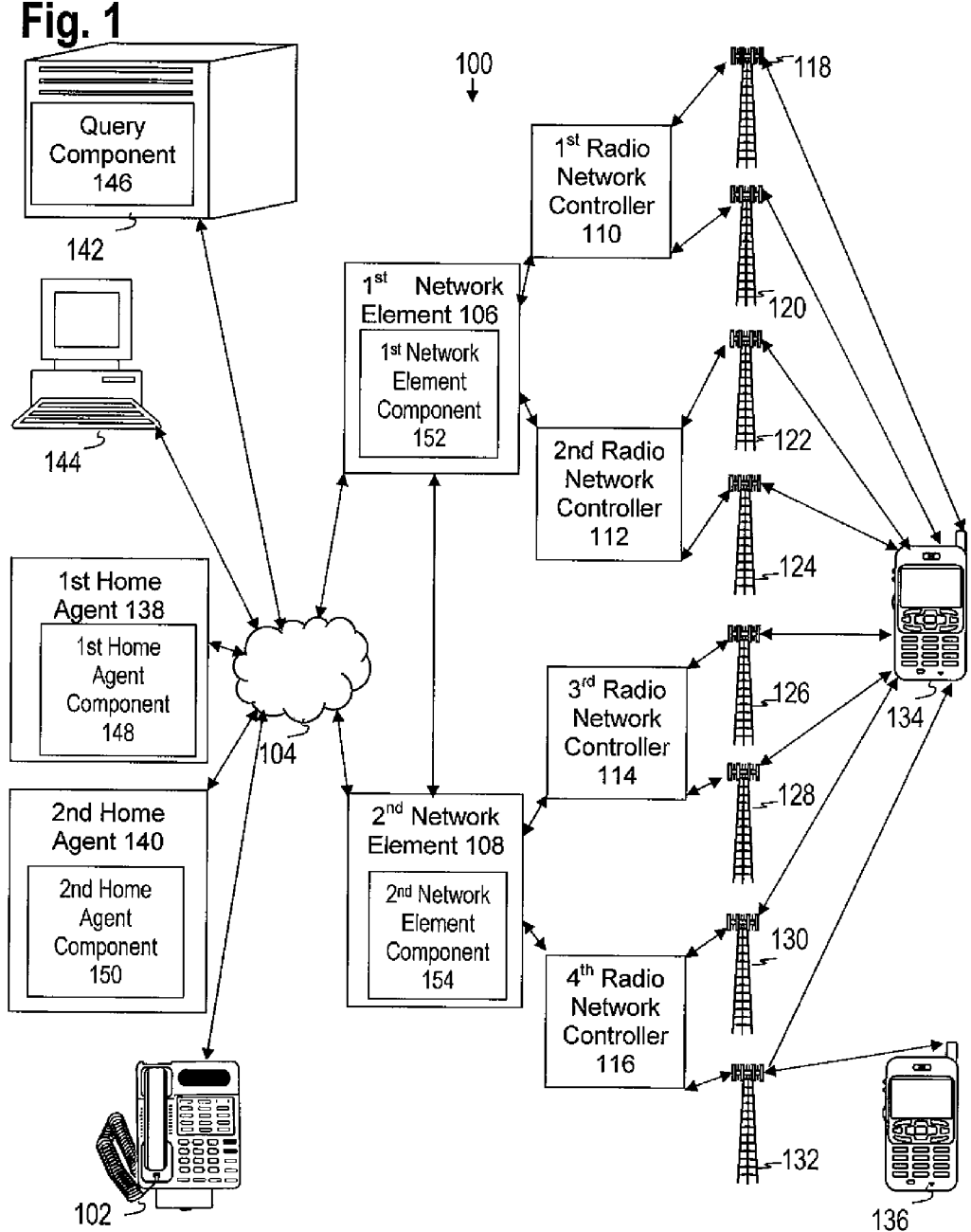
FIG. 1 illustrates a wireless communications system for network management based on mobility agent binding tables according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Systems and methods are provided for automated network management based on mobility agent binding tables. In an embodiment, duplicate binding tables may be provided to promote access of automated network management to the bindings information stored in the duplicate binding tables without impeding and/or interfering with the operation of home agents and/or foreign agents. In some embodiments, a mobility agent component promotes writing a mobility agent update to a mobility agent binding table in response to receipt of a mobility agent update. For example, a foreign agent component modifies a foreign agent to respond to the receipt of a foreign agent update by writing the foreign agent update to both the standard foreign agent binding table that the foreign agent typically uses and to a duplicate foreign agent binding table within the foreign agent component to provide enhanced access for queries. Each duplicate home agent binding table may be located with the corresponding home agent and each duplicate foreign agent binding table may be located with the corresponding foreign agent. Alternatively, the duplicate home agent binding tables and the duplicate foreign agent binding tables may be located with a centralized network component. In some embodiments, the mobility agent components may provide application program interfaces. For example, a home agent application program interface promotes enhanced access to the standard home agent binding table and the foreign agent application program interface promotes enhanced access to the standard foreign agent binding table.

A query component queries multiple mobility agent binding tables to obtain data associated with multiple mobile devices. The query component may query the duplicate home agent binding tables and the duplicate foreign agent binding tables to obtain data associated with multiple mobile devices to identify a group of mobile devices in a geographic location. For example, a toxic chemical spill occurs in an area that is surrounded by four base transceiver stations ("BTS's"). In this example, the query component queries each home agent binding table to retrieve data that identifies foreign agents that may be associated with the four BTS's. If the effects of the toxic chemical spill are limited to specific cell tower sectors for the four BTS's, the query component may query the identified foreign agents' binding tables to retrieve data that identifies any radio network controllers associated with the four BTS's, and query the identified radio network controllers to retrieve data that identifies the cell tower sectors for the four BTS's. Continuing this example, the query component may identify the group of mobile devices that are using the identified BTS's or the identified cell tower sectors. The identified group of mobile devices may be associated with a home agent, a foreign agent, a radio network controller, a base transceiver station, and/or a cell tower sector associated with the base transceiver station, such as a group of half a million mobile phones associated with a foreign agent. If the query component identifies the group of mobile devices using the specific cell tower sectors of the four BTS's, the query component may cross reference the network access identifiers listed in the home agent binding tables that correspond to the care-of addresses for the group of mobile devices listed in foreign agent binding tables. The query component may send a message to the identified group of mobile devices via the network access identifiers and the home addresses associated with the mobile devices. For example, the query component may send a message to the group of mobile devices about the toxic chemical spill.

The query component may also compare the data to at least one threshold and adjust an operational parameter of a base transceiver station based on the comparison. For example, in response to complaints about dropped calls in a particular cell tower sector, the query component may retrieve binding tables data that leads to the conclusion that an adjoining cell tower sector is responsible for the problem and output an adjustment of an antenna on the corresponding cell tower to compensate for the problem. In contrast to limited access to binding tables data for a few mobile devices, the query component may enable network management to manage a communication network more efficiently based on enhanced access to mobility agent binding tables for large groups of mobile devices.

Network managers may use data in mobility agent binding tables to assist in the management of a communication network, but efficiently accessing the data in the binding tables typically has been a challenge. Mobility agents, such as home agents and foreign agents, may encrypt their binding tables and the communications that the mobility agents convey to protect the privacy of mobile device users because binding tables may be used to identify the geographic location of a mobile device. Mobility agent vendors may encrypt and limit access to their mobility agents to protect the security of the proprietary software in their mobility agents. Customer care representatives for communication providers typically are not given access to binding tables because mobility agents store data in complex formats that may differ for each model and/or for each vendor, such that inadvertent actions during access may negatively impact the operations of the mobility agents. Access to binding tables is typically provided to a few network managers through command line interfaces which may access a limited amount of data for each command and which typically do not enable complex queries.

If a law enforcement agency requests the location of a mobile device, such as when a child using the mobile device is missing, the process of accessing binding tables to identify the location of the child's mobile device has typically required many teams manually inputting commands over an extended period of time. For example, a network manager may type in command lines to individually search each home agent binding table in the network for the network access identifier (such as billysmith@network.com) for a missing child's mobile phone. After the network manager locates the home agent binding table that stores the specific network access identifier, the network manager may type in other command lines to request the care-of address and the foreign agent associated with the network access identifier from the home agent binding table. After the network manager retrieves the foreign agent and the care-of address, the network manager may type in other command lines to request identification of the base transceiver station associated with the child's mobile phone from the identified foreign agent. Identifying the BTS may provide a rough estimate of the location for the child's mobile phone. The network manager also may use the network access identifier, the home address, and the care-of address to type in command lines to request the child's mobile phone to execute a location technology, such as a global positioning system (GPS) technology, to estimate the location of the child's mobile phone and to report the location to the network manager. The network manager needs information in the binding tables for such command lines because the network access identifier typically is not sufficient to access the child's mobile phone. Even though a mobile device may not have access to all of the data in the binding tables for the mobile device, a technologically sophisticated criminal may be able to detect if a network manager is attempting to use information in the criminal's mobile device to locate the criminal for a law enforcement agency, and the criminal may be able to block any such attempt.

Network managers also may use computer software and/or hardware known as packet analyzers to intercept, log, and analyze IP packets. However, IP packets do not include all of the data stored by the mobility agents that are routing the IP packets. Although a packet analyzer can intercept IP packets routed by a mobility agent, the packet analyzer typically has to wait until whenever the mobility agent routes the IP packets.

FIG. 1 shows a wireless communications system 100 suitable for implementing several embodiments of the present disclosure. The system 100 includes a communication device 102, a network 104, a $1^{st}$ network element 106, a $2^{nd}$ network element 108, a $1^{st}$ radio network controller 110, a $2^{nd}$ radio network controller 112, a $3^{rd}$ radio network controller 114, a $4^{th}$ radio controller 116, a $1^{st}$ base transceiver station (BTS) 118, a $2^{nd}$ BTS 120, a $3^{rd}$ BTS 122, a $4^{th}$ BTS 124, a $5^{th}$ BTS 126, a $6^{th}$ BTS 128, a $7^{th}$ BTS 130, an $8^{th}$ BTS 132, a $1^{st}$ mobile device 134, a $2^{nd}$ mobile device 136, a $1^{st}$ home agent 138, and a $2^{nd}$ home agent 140.

The $1^{st}$ network element 106 and the $2^{nd}$ network element 108 may be foreign agents or packet data serving nodes (PDSN's). If the network elements 106-108 are PDSN's, these network elements 106-108 may not store all of the data that a foreign agent would store in its binding tables, but the network elements 106-108 may store some of the data that a foreign agent would store in its binding tables. Although FIG. 1 depicts each of the network elements 106-108 as directly corresponding to specific radio network controllers 110-116, the network elements 106-108 may balance between themselves the communication load from each of the radio network controllers 110-116. Communications from the communication device 102 may reference the home agents 138-140 to determine the path to communicate with the $1^{st}$ mobile device 134 via the network elements 106-108, the radio network controllers 110-116, and the BTS's 118-132.

The system 100 also includes a server 142 and a user interface 144 which may communicate with the network components 102 and 106-140 via the network 104. The server 142 may execute a query component 146 to communicate with a $1^{st}$ home agent component 148 on the $1^{st}$ home agent 138, a $2^{nd}$ home agent component 150 on the $2^{nd}$ home agent 140, a $1^{st}$ network element component 152 on the $1^{st}$ network element 106, and a $2^{nd}$ network element component 154 on the $2^{nd}$ network element 108.

The mobility agent components 148-154 may promote writing a mobility agent update to a mobility agent binding table in response to receipt of a mobility agent update. For example, the $1^{st}$ home agent component 148 modifies the $1^{st}$ home agent 138 to respond to the receipt of a home agent update by writing the home agent update to both the standard home agent binding table that the $1^{st}$ home agent 138 typically uses and to a duplicate home agent binding table within the $1^{st}$ home agent component 148 to provide enhanced access for queries by the query component 146.

A home agent binding table stores data that may identify a network access identifier, a home address, a foreign agent, a care-of address, a policy server, an authentication-authorization-accounting server, and/or a time to live. A policy server is a security component of a policy-based communication network that provides authorization services and facilitates tracking and control of files. An authentication-authorization-accounting server may establish the digital identity of an entity or user, grant specific types of privileges (including "no privilege") to an entity or a user based on their authentication, and track the consumption of network resources by entities and users. The time to live is the number of journeys or "hops" that a packet is allowed to take from one router to another until the packet is discarded by a router. A foreign agent binding table stores data that may identify the network access identifier, the home agent, the home address, the care of address, a radio network controller, a communication technology, an international mobile subscriber identification (IMSI), and/or the time to live. Examples of communication technologies include code division multiple access (CDMA), global system for mobile communication (GSM), universal mobile telecommunications system (UMTS), and worldwide interoperability for microwave access (WiMAX). The IMSI is a unique number, typically 15 digits long, associated with all GSM and UMTS network mobile phone users, and is used in any mobile communication network that interconnects with other communication networks. The first 3 digits of the IMSI are the mobile country code, followed by the mobile network node (MNC), and the remaining digits are the mobile station identification number (MSIN) within a communication network's customer base.

Each duplicate home agent binding table may be located with its corresponding home agent, such as the home agents 138-140, and each duplicate foreign agent binding table may be located with its corresponding foreign agent, such as the network elements 106-108. If all of the duplicate binding agents are stored locally, the network 104 does not have to expend bandwidth to frequently transmit the data in the binding tables from the mobility agents to a centralized storage location. Local storage may also reduce the need to correlate incoming data from many mobility agents. Although a query accessing a foreign agent for locally stored bindings of half a million mobile devices may overload the responding foreign agent, adding an additional processor to the foreign agent may assist in accessing the binding table without overloading the central processor for the foreign agent. In this situation, data may be accessed in the duplicate binding tables without impacting a mobility agent's use of the standard binding tables.

Alternatively, each duplicate home agent binding table and each duplicate foreign agent binding table may be located with a centralized network component, such as the server 142. Centrally storing the data from binding tables may significantly reduce the chances of overloading mobility agents, but without the expenses of adding additional processors. The data from binding tables may be stored as distinct tables or as data integrated into a larger data structure.

In some embodiments, the mobility agent components 148-154 may provide application program interfaces. For example, a home agent application program interface in the $1^{st}$ home agent component 148 promotes enhanced access to the standard home agent binding table in the $1^{st}$ home agent 138, and the foreign agent application program interface in the $1^{st}$ network component 152 promotes enhanced access to the standard foreign agent binding table in the $1^{st}$ network element 106. Using application program interfaces to provide enhanced access to the data in standard binding tables may eliminate the expenses of maintaining duplicate binding tables or transmitting the data in the standard binding tables from the mobility agents to a centralized storage location. However, the standard binding tables may not store time stamps for communications, thereby reducing the possibility of storing a history for mobile devices that may enable a network manager to project the direction and speed of movement for a mobile device into the future. Time stamps also may enable the query component 146 to identify dormant mobile devices, such as mobile devices that have not communicated an IP packet for an extended period of time. Furthermore, using application program interfaces to access the standard binding tables may require the expenses of adding additional processors to reduce the chances that a query accessing a foreign agent for bindings of half a million mobile devices overloads the central processor of the responding foreign agent.

The query component 146 queries multiple mobility agent binding tables to obtain data associated with the mobile devices 134-136. The data is associated with at least two of a home agent binding table, a foreign agent binding table, a packet data serving node, a radio network controller, and a base transceiver station. For example, the query component 146 may query the duplicate home agent binding table in the $1^{st}$ home agent component 148 and the duplicate foreign agent binding table in the $1^{st}$ network element component 152 to obtain data associated with the mobile devices 134-136 to identify a group of mobile devices in communication with the $8^{th}$ BTS 132. In this example, the query component 146 may query a home agent binding table that stores data that identifies a foreign agent, such as the $2^{nd}$ network element 108. The query component 146 may query the foreign agent's binding table that stores data that identifies the 4th radio network controller 116 and the $8^{th}$ BTS 132. The query component 146 may also query the 4th radio network controller 116 to access data that identifies the cell tower sectors for the $8^{th}$ BTS 132.

The identified group of mobile devices 134-136 may be associated with a home agent, a foreign agent, a packet data serving node, a radio network controller, a base transceiver station, and/or a cell tower sector associated with the base transceiver station, such that the data may identify a group of mobile devices based on communication via a common network component. Continuing this example, the query component 146 identifies the mobile devices 134-136 that are using a specific cell tower sector for the $8^{th}$ BTS 132. Having identified the mobile devices 134-136 using the specific cell tower sector for the $8^{th}$ BTS 132, the query component 146 may cross reference the network access identifiers and the home addresses listed in the binding tables for the $1^{st}$ home agent 138 that correspond to the care-of addresses for the mobile devices 134-136 listed in foreign agent binding table.

The query component 146 may send a message to the mobile devices 134-136 via the network access identifiers and the home addresses associated with the mobile devices 134-136. For example, the query component 146 uses the network access identifiers and the home addresses that binding tables associate with the mobile devices 134-136 to send a short message service (SMS) message to the mobile devices 134-136 about a planned outage for the $8^{th}$ BTS 132. Due to the challenges in conducting complex queries, communication providers typically cannot identify mobile devices for receipt of such messages. In another example, the enhanced access to data in mobility agent binding tables may enable the query component 146 to identify the location of a missing child's mobile device as within a specific cell sector for the $8^{th}$ BTS 132 in only a minute. Furthermore, the query component 146 may send a missing child message only to the mobile devices 134-136 that are using the $8^{th}$ BTS 132 because the communication service provider does not want to unnecessarily send the message to other mobile devices that are not in the child's likely vicinity. The query component 146 may send other messages to the mobile devices that are communicating via the same cell tower sector, the same BTS, the same radio network controller, or the same foreign agent in response to other emergencies, such as a toxic chemical spill or a campus shooting.

The query component 146 also may compare the data to at least one threshold and adjust an operational parameter of one of the BTS's 118-132 based on the comparison. For example, in response to complaints about dropped calls in a particular cell tower sector, the query component 146 queries binding tables to retrieve data that indicates an adjoining cell tower sector is responsible for the problem and outputs an adjustment of an antenna on the corresponding cell tower to compensate for the problem. In another example, the query component 146 may compare the data associated with a cell tower that serves a residential area to a residential communication threshold and identify a mobile device user that is conducting a significant amount of IP communications, which may be due to the user operating a business out of his home. In this situation, the communication service provider may offer the mobile device user a significant discount to access an IP communication land line, or provide feedback to the user about appropriate use policies. In response, the query component 146 may adjust an operational parameter to optimally serve the mobile devices users in the residential area once the IP communication load from the business has been directed to the IP communication land line.

The query component 146 may terminate IP communication for the mobile devices 134-136 based on the data from the mobility agent binding tables, which may store time stamps associated with IP communications for the mobile devices 134-136. For example, the time stamps in the binding tables indicate that the $1^{st}$ mobile device 134 last communicated via the $8^{th}$ BTS 132 1 second ago and that the $2^{nd}$ mobile device 136 last communicated via the $8^{th}$ BTS 132 more than 1 minute ago. If the $8^{th}$ BTS 132 is on the verge of exceeding its communication capacity, the query component 146 may identify which time stamps for the mobile devices 134-136 exceed a time stamp threshold of 30 seconds. Continuing this example, the query component 146 may terminate IP communication for the $2^{nd}$ mobile device 136 and send an explanatory message to be displayed when the $2^{nd}$ mobile device 136 requests IP communication, but enable the continued IP communication for the $1^{st}$ mobile device 134. In another example, when a malfunctioning foreign agent is repaired, the query component 146 may access the home agents 138-140 to restore some of the data in the foreign agent's binding tables by identifying care-of addresses for the foreign agent and the mobile devices 134-136 that were communicating via the foreign agent. In contrast to limited access to binding tables data for a few mobile devices, the query component 146 may enable network management to manage a communication network more efficiently based on enhanced access to mobility agent binding tables for large groups of mobile devices 134-136.

Figure 4:
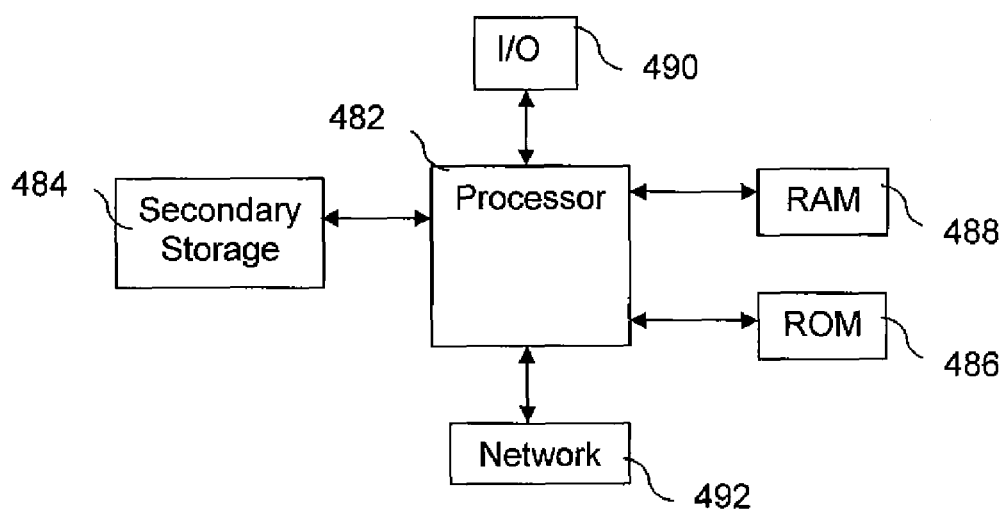
FIG. 4 illustrates an exemplary computer system suitable for implementing some aspects of the several embodiments of the disclosure.

The server 142 may be a computer, which is discussed in more detail below in reference to FIG. 4. Though illustrated as mobile phones, the mobile devices 134-136 may take various forms including personal digital assistants (PDA), mobile computers, digital cameras, mobile telecommunication devices, digital music players, mobile handsets, handheld gaming devices, wireless mobile devices, pagers, portable computers, tablet computers, laptop computers, media players, inventory control devices, and digital calculators. Suitable mobile devices 134-136 may combine some or all of these functions. The mobile devices 134-136 may communicate via the BTS's 118-132 and the network 104 by a standard wireless telephony protocol, such as code division multiple access (CDMA), global system for mobile communication (GSM), universal mobile telecommunications system (UMTS), and worldwide interoperability for microwave access (WiMAX), a wireless internet connection, or some other means of wireless communication. While specific numbers of system component 102-154 are shown in FIG. 1, the system 100 may include any number of system components 102-154.

Figure 2:
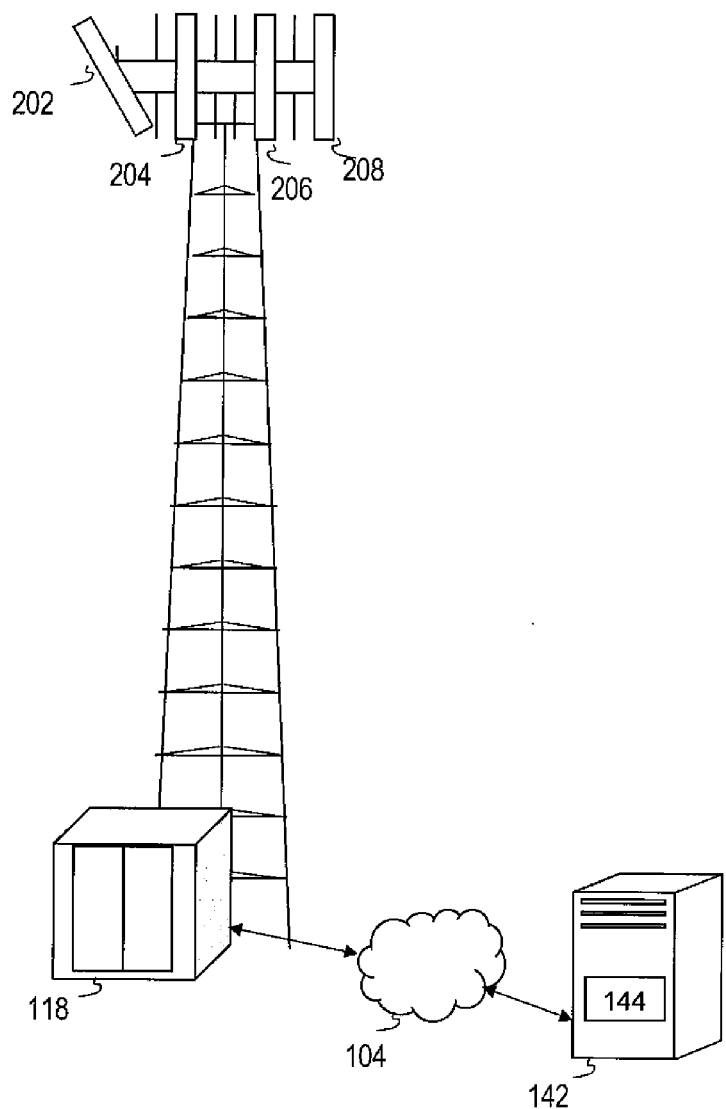
FIG. 2 illustrates a base transceiver station for network management based on mobility agent binding tables according to some embodiments of the present disclosure.

FIG. 2 shows the $1^{st}$ base transceiver station 118 according to some embodiments of the present disclosure. The $1^{st}$ BTS 118 includes antennas 202-208, which may be automatically adjustable antennas. The $1^{st}$ BTS 118 may comprise an electronic equipment cabinet or box coupled to an antenna system positioned on top of a tower or other structure. The $1^{st}$ BTS 118 also may provide radio access from the $1^{st}$ mobile device 134 to the network 104, thereby promoting voice and/or data communications service access to the $1^{st}$ mobile device 134. A variety of mobile communications parameters may be configured during the initial installation and activation of the $1^{st}$ BTS 118. Some of these mobile communication parameters may affect the number of active calls that may be supported concurrently by the $1^{st}$ BTS 118, how large a coverage area the $1^{st}$ BTS 118 is able to provide, how much power is consumed by the $1^{st}$ BTS 118, and others. Generally, these mobile communication parameters may affect both the quality of service experienced by mobile device service subscribers and operational efficiency.

The query component 146 may communicate with the $1^{st}$ BTS 118 via the network 104 to promote adjustment of an operational parameter for the $1^{st}$ BTS 118, for example, by sending instructions that rotate or tilt the antennas 202-208. In FIG. 2, the query component 146 instructs the $1^{st}$ BTS 118 to adjust the tilt of antenna 202. The adjustment may be a BTS antenna tilt or a BTS antenna rotation.

An operational parameter may be a parameter associated with a radio frequency loading factor, a dynamic hand down distance, a pilot signal power, a supplemental channel admission threshold, an overhead and traffic channel power, a voice power control, a data power control, a handoff, a subscriber access control, or timing and access. The data retrieved by the query component 146 may be associated with a voice quality, a coverage area, a dropped call, a hand down failure, a carrier balance, an averaged mobile device signal power, a traffic load, a maximum transmitter power, pilot strength, orthogonal frequency division multiple access (OFDMA) channel quality indicators (CQI), and/or channel availability. The operational parameters of the $1^{st}$ BTS 118 adjusted by the query component 146 may include operational parameters which are traditionally not adjusted frequently. For example, the query component 146 may adjust the combination of the parameters associated with the overhead and traffic channel power, the voice power control, and the data power control. The query component 146 may successively adjust each of the combination of parameters in turn multiple times, measuring or determining BTS performance after each round of adjustments or after each individual parameter adjustment to serve as a basis for determining the next round of adjustments. The successive adjustments may be determined with the understanding that adjustments to one of the combination of parameters may alter the preferred setting of one or more of the other of the combination of parameters, to converge on a substantially preferred or substantially optimal performance.

The adjustment may be based on balancing considerations for voice quality, dropped calls, offered traffic, and coverage area. For example, if the query component 146 promotes adjustment of an operational parameter to increase the coverage area for the $1^{st}$ BTS 118, the larger coverage area served by the $1^{st}$ BTS 118 may result in more dropped calls for the $1^{st}$ mobile device 134. More dropped calls may result when the $1^{st}$ mobile device 134 is located in the increased coverage area for the $1^{st}$ BTS 118, which offers a diminished signal power over the coverage area for the $1^{st}$ BTS 118.

Adjusting an operational parameter for the $1^{st}$ BTS 118 may be based on mobile device subscribers with more dropped calls than a dropped calls threshold. For example, if the query component 146 determines that a substantial number of subscribers in the coverage area for the $1^{st}$ BTS 118 have recently experienced more dropped calls than a dropped calls threshold, the query component 146 may promote adjustment of the antenna 202 to decrease the coverage area for the $1^{st}$ BTS 118.

Adjusting an operational parameter of a base transceiver station may be based on an adjustment cost and/or an adjustment benefit. For example, if the query component 146 determines that adjusting the antenna 202 incurs only the small cost for operating an electrical motor that automatically adjusts the antenna 202, and determines that the results from this adjustment decreasing the coverage area for the $1^{st}$ BTS 118 would benefit a specific number of subscribers in the area who have recently experienced more dropped calls than a dropped calls threshold, then the query component 146 may balance the costs and benefits to make the adjustment decision. Alternatively, the query component 146 may provide this cost/benefit information to the user interface 144 to enable a network manager to make the adjustment decision.

Adjusting an operational parameter for the $1^{st}$ BTS 118 also may be based on data associated with subscriptions of selected mobile device subscribers, for example mobile device subscribers deemed to be high value subscribers. For example, a specific group of subscribers may pay premiums for services based on infrequent dropped call rates. Identification of a high value subscriber may also be based on a group of subscribers who experienced more dropped calls than a dropped calls threshold over a period of time. Alternatively, a user profile of mobile device subscribers that contains demographics information about the subscribers, for example, length of previous subscription or length of current subscription contract, may be used to identify high value subscribers. The query component 146 may promote adjustment of the antenna 202 to reduce dropped call rates or otherwise to increase service quality for the specific group of subscribers even if a substantial number of subscribers in the coverage area for the $1^{st}$ BTS 118 have not recently experienced more dropped calls than the dropped calls threshold or even with the consequence that other lower value subscriber devices experience increased dropped calls or other decreased service quality. Because the adjustments of operational parameters of the $1^{st}$ BTS 118 are dynamic and can be applied automatically and/or remotely, these adjustments can be made by the $1^{st}$ BTS 118 and the $2^{nd}$ BTS 120 as high value subscribers migrate from one coverage area to another, for example from the coverage area for the $1^{st}$ BTS 118 to the coverage area for the $2^{nd}$ BTS 120.

Adjusting an operational parameter for the $1^{st}$ BTS 118 may include outputting a request via a user interface. For example, if the query component 146 determines to promote adjustment of the antenna 202 for the $1^{st}$ BTS 118, but $1^{st}$ BTS 118 is not a base transceiver station with automatically adjusting antennas, the query component 146 may output a request for a technician to manually adjust the antenna 202.

A request may be for additional hardware. For example, if the comparison indicates that the coverage area for the $1^{st}$ BTS 118 and the coverage area for the $2^{nd}$ BTS 120 are inadequate to cover the geographic area between the $1^{st}$ BTS 118 and the $2^{nd}$ BTS 120, the request may be to add an additional BTS that has a coverage area that can adequately provide for the area between the $1^{st}$ BTS 118 and the $2^{nd}$ BTS 120.

A request may be to shut down a BTS. For example, if the comparison indicates that the $1^{st}$ BTS 118 and the $3^{rd}$ BTS 122 have been capable of covering the coverage area for the $2^{nd}$ BTS 120 over a prolonged period of time, the request may be to shut down the $2^{nd}$ BTS 120.

The query component 146 may adjust another operational parameter of another BTS based on the comparison and the data. For example, the query component 146 promotes adjustment of the antenna tilt for the $2^{nd}$ BTS 120 based on the data associated with the $1^{st}$ BTS 118 and a comparison of data associated with the $1^{st}$ BTS 118. The comparison may be of the coverage area for the $1^{st}$ BTS 118 to a threshold for the coverage area for the $1^{st}$ BTS 118 and the data may indicate that the coverage area for the $1^{st}$ BTS 118 may not be sufficient for the coverage area assigned to the $1^{st}$ BTS 118.

The query component 146 may establish a frequency period for subsequent adjustments based on determining whether an adjustment produced a desired result. For example, if the query component 146 promotes adjustment of the antenna tilt for the $1^{st}$ BTS 118 based on data from a three hour period associated with morning rush hour traffic, the query component 146 may compare subsequently obtained data with a threshold condition to insure that the adjustment produced the desired result within the specified time period. If the adjustment did not produce the desired result, the query component 146 has time to promote making another adjustment of any operational parameter to produce the desired result. If the query component 146 determines that the adjustment produced the desired result, the query component 146 may promote adjustment of the frequency period for subsequent comparisons and adjustments to be longer. In another example, the query component 146 may determine that readjusting antenna tilt every half hour is too frequent of a time period for antenna readjustment because the system 200 needs more than a half hour to settle after such adjustments.

Figure 3:
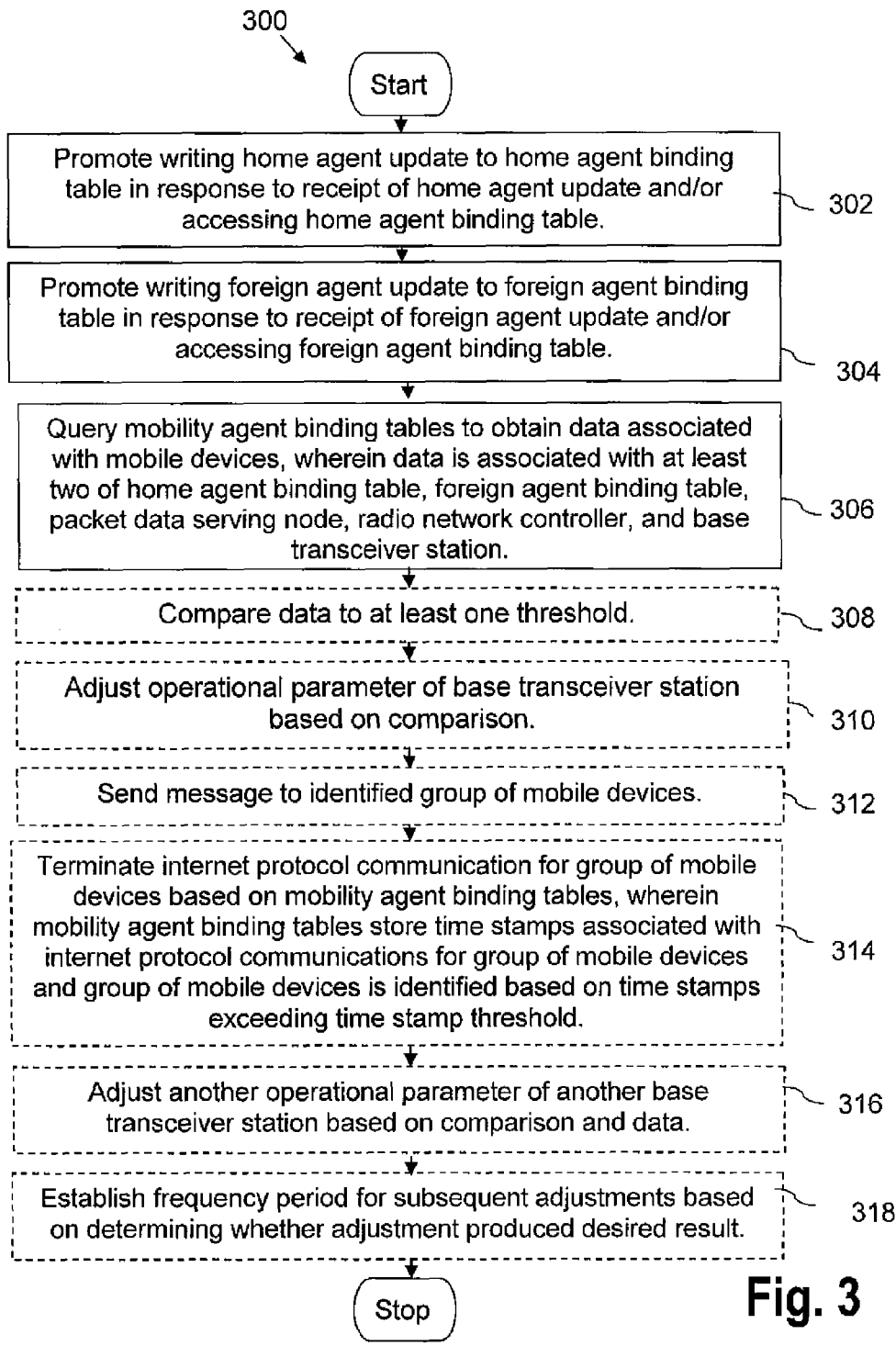
FIG. 3 is a flowchart of a method for network management based on mobility agent binding tables according to some embodiments of the present disclosure.

FIG. 3 is a flowchart illustrating a method 300 for network management based on mobility agent binding tables according to some embodiments of the present disclosure. The system 100 may execute the method 300 to manage a communication network based on efficiently accessing mobility agent binding tables.

In box 302, a home agent update is written to a home agent binding table in response to receipt of a home agent update and/or a home agent binding table is accessed. For example, the $1^{st}$ home agent component 148 is an application program interface that promotes accessing the home agent binding table for the $1^{st}$ home agent 138.

In box 304, a foreign agent update is written to a foreign agent binding table in response to receipt of foreign agent update and/or a foreign agent binding table is accessed. For example, the $2^{nd}$ network element component 154 modifies the $2^{nd}$ network element 108 to also write a foreign agent update to a duplicate foreign agent binding table in the $2^{nd}$ network element component 154 in response to receipt of a foreign agent update.

In box 306, mobility agent binding tables are queried to obtain data associated with the mobile devices, wherein the data is associated with at least two of a home agent binding table, a foreign agent binding table, a packet data serving node, a radio network controller, and a base transceiver station. For example, the query component 146 queries the home agent binding table for the $1^{st}$ home agent 138 and the foreign agent binding table for the $1^{st}$ network element 106 to obtain data associated with the mobile devices 134-136.

In box 308, data is optionally compared to at least one threshold. For example, the query component 146 compares data for the coverage area for the $1^{st}$ BTS 118 to a threshold for the coverage area for the $1^{st}$ BTS 118 to determine if the coverage area for the $1^{st}$ BTS 118 is sufficient for a coverage area assigned to the $1^{st}$ BTS 118.

In box 310, an operational parameter of the base transceiver station is optionally adjusted based on the comparison. For example, the query component 146 promotes adjustment of the antenna tilt for the antenna 202 based on the comparison of the coverage area for the $1^{st}$ BTS 118.

In box 312, a message is optionally sent to the identified group of mobile devices. For example, the query component 146 sends a message to the mobile devices 134-136 about the planned outage for the $8^{th}$ BTS 132.

In box 314, internet protocol communication is optionally terminated for a group of mobile devices based on the data from the mobility agent binding tables, wherein the mobility agent binding tables store time stamps associated with internet protocol communications for the group of mobile devices, and the group of mobile devices is identified based on the time stamps exceeding a time stamp threshold. For example, the query component 146 terminates IP communication for the $2^{nd}$ mobile device 136 based on the time stamp for the last IP communication by the $2^{nd}$ mobile device 136.

In box 316, another operational parameter of another base transceiver station is optionally adjusted based on the comparison and the data. For example, the query component 146 promotes adjustment of the antenna tilt for the $2^{nd}$ BTS 120 based on the data associated with the $1^{st}$ BTS 118 and a comparison of data associated with the $1^{st}$ BTS 118.

In box 318, a frequency period for subsequent adjustments is established based on determining whether the adjustment produced a desired result. For example, if the query component 146 promotes adjustment of the antenna tilt for the $1^{st}$ BTS 118 based on data for a three hour period associated with morning rush hour traffic, the method 300 may execute recursively one hour later so that the query component 146 may compare subsequently obtained data with a threshold condition to insure that the adjustment produced the desired result within the specified time period.

The system described above may be implemented on a computer with sufficient processing power, memory resources, and network throughput capability to handle the necessary workload placed upon it. FIG. 4 illustrates a typical computer system, such as the server 142, suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if the RAM 488 is not large enough to hold all working data. Secondary storage 484 may be used to store programs which are loaded into the RAM 488 when such programs are selected for execution. The ROM 486 is used to store instructions and perhaps data which are read during program execution. The ROM 486 is a non-volatile memory device which typically has a small memory capacity relative to the larger memory capacity of secondary storage. The RAM 488 is used to store volatile data and perhaps to store instructions. Access to both the ROM 486 and the RAM 488 is typically faster than to the secondary storage 484.

The I/O devices 490 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 492 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), worldwide interoperability for microwave access (WiMAX), and/or global system for mobile communications (GSM) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using the processor 482, may be received from and outputted to the network, for example, in the form of a computer data signal embodied in a carrier wave.

Such information, which may include data or instructions to be executed using the processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered the secondary storage 484), the ROM 486, the RAM 488, or the network connectivity devices 492. While only one processor 482 is shown, multiple processors may be present. Thus, while instructions may be discussed as executed by a processor 482, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method for network management based on mobility agent binding tables, comprising:
 querying a plurality of mobility agent binding tables to obtain data associated with a plurality of mobile devices in a geographic location, wherein the data is associated with at least two of a home agent binding table, a foreign agent binding table, a packet data serving node, a radio network controller, and a base transceiver station, wherein at least one of the plurality of mobility agent binding tables comprises time stamps associated with internet protocol communications for a plurality of mobile devices;
 comparing the data to at least one threshold;
 adjusting an operational parameter of a base transceiver station based on the comparison, wherein adjusting the operational parameter of the base transceiver station is also based on at least one of an adjustment cost and an adjustment benefit, and wherein the operational parameter is a parameter associated with at least one of a radio frequency loading factor, a dynamic hand down distance, a pilot signal power, a supplemental channel admission threshold, an overhead and traffic channel power, a voice power control, a data power control, a handoff, a subscriber access control, and timing and access;
 identifying a group of mobile devices based on the time stamps exceeding a time stamp threshold; and
 terminating the internet protocol communication for the plurality of mobile devices.

2. The computer implemented method of claim 1, wherein adjusting the operational parameter of the base transceiver station is also based on subscriptions of selected mobile device subscribers.

3. The computer implemented method of claim 1, wherein adjusting the operational parameter of the base transceiver station is also based on adjusting for mobile device subscribers with more dropped calls than a dropped calls threshold.

4. The computer implemented method of claim 1, wherein the adjustment is at least one of a cell tower antenna tilt and a cell tower antenna rotation.

5. The computer implemented method of claim 1, wherein the adjustment is based on voice quality, dropped calls, and coverage area.

6. The computer implemented method of claim 1, wherein adjusting the operational parameter of the base transceiver station comprises outputting a request via a user interface.

7. The computer implemented method of claim 6, wherein the request is for additional hardware.

8. The computer implemented method of claim 6, wherein the request is to shut down the base transceiver station.

9. The computer implemented method of claim 1, further comprising establishing a frequency period for subsequent adjustments based on determining whether the adjustment produced a desired result.

10. The computer implemented method of claim 1, further comprising adjusting another operational parameter of another base transceiver station based on another comparison and the data.

11. A system for network management based on mobility agent binding tables, comprising:
 a first processor on a home agent;
 a home agent component, when executed by the first processor, that promotes at least one of writing a home agent update to a home agent binding table in response to receipt of a home agent update and accessing the home agent binding table, wherein the home agent binding table stores data that identifies at least one of a network access identifier, a home address, a foreign agent, a care of address, a policy server, an authentication-authorization-accounting server, and a time to live;
 a second processor on a foreign agent;
 a foreign agent component, when executed by the second processor, that promotes at least one of writing a foreign agent update to a foreign agent binding table in response to receipt of a foreign agent update and accessing the foreign agent binding table, wherein the foreign agent binding table stores data that identifies at least one of the network access identifier, the home agent, the home address, the care of address, a radio network controller, a communication technology, an international mobile subscriber identification, and the time to live;
 a third processor on a network component;
 a query component, when executed by the third processor, that queries at least one of the foreign agent binding table and the home agent binding table to obtain data associated with a plurality of mobile devices to promote a management action, wherein the at least one of the foreign agent binding table and the home agent binding table store time stamps associated with internet protocol communications for the plurality of mobile devices, and wherein the query component, when executed by the third processor, identifies a group of mobile devices based on the time stamps exceeding a time stamp threshold and terminates internet protocol communication for the group of mobile devices.

12. The system of claim 11, wherein the home agent component comprises an application program interface that promotes accessing the home agent binding table, and the foreign agent component comprises an application program interface that promotes accessing the foreign agent binding table.

13. The system of claim 11, wherein the home agent binding table is located with the home agent and the foreign agent binding table is located with the foreign agent.

14. The system of claim 11, wherein the home agent binding table and the foreign agent binding table are located with a second network component.

15. The system of claim 11, wherein the management action is adjusting an operation parameter of a base transceiver station.

16. The system of claim 15, where the adjusting an operation parameter of a base transceiver station is based on comparing the data to at least one threshold.

17. The system of claim 11, wherein the query component, when executed by the third processor, sends a message to a group of mobile devices identified based on the data via network access identifiers associated with the group of mobile devices.

* * * * *